US011113079B2

(12) United States Patent
Golbandi

(10) Patent No.: US 11,113,079 B2
(45) Date of Patent: Sep. 7, 2021

(54) MOBILE ASSISTANT

(71) Applicant: Yahoo!, Inc., Sunnyvale, CA (US)

(72) Inventor: Nadav Golbandi, Sunnyvale, CA (US)

(73) Assignee: Verizon Media Inc., New York, NY (US)

(*) Notice: Subject to any disclaimer, the term of this patent is extended or adjusted under 35 U.S.C. 154(b) by 404 days.

(21) Appl. No.: 15/132,316

(22) Filed: Apr. 19, 2016

(65) Prior Publication Data

US 2017/0300345 A1 Oct. 19, 2017

(51) Int. Cl.
*G06F 9/44* (2018.01)
*G06F 3/14* (2006.01)
*G06F 3/0482* (2013.01)
*G06F 3/0484* (2013.01)
*G06Q 50/12* (2012.01)
*G06Q 10/02* (2012.01)
*G06F 9/451* (2018.01)
*G06F 3/0481* (2013.01)

(52) U.S. Cl.
CPC .......... *G06F 9/453* (2018.02); *G06F 3/0481* (2013.01); *G06Q 10/02* (2013.01); *G06Q 50/12* (2013.01)

(58) Field of Classification Search
CPC ........ G06Q 10/02; G06Q 30/02; G06Q 50/12; G10L 15/1815; G06F 3/0482; G06F 3/167; G06F 17/30867; G06F 9/453; G06F 3/0481
See application file for complete search history.

(56) References Cited

U.S. PATENT DOCUMENTS

| 7,962,578 | B2 * | 6/2011 | Makar | G06F 9/44 |
| | | | | 704/9 |
| 8,346,563 | B1 * | 1/2013 | Hjelm | G10L 15/1822 |
| | | | | 379/88.01 |
| 9,787,822 | B1 * | 10/2017 | Holland | H04M 1/72566 |
| 2007/0061242 | A1 * | 3/2007 | Ramer | G06Q 10/10 |
| | | | | 705/37 |
| 2007/0166686 | A1 * | 7/2007 | Foster | G09B 7/06 |
| | | | | 434/323 |
| 2012/0016678 | A1 * | 1/2012 | Gruber | G06F 17/3087 |
| | | | | 704/275 |

(Continued)

OTHER PUBLICATIONS

B. AbuShawar, E. Atwell; ALICE Chatbot: Trails and Outputs; Jun. 18, 2015.*

(Continued)

*Primary Examiner* — Justin S Lee
*Assistant Examiner* — Carl E Barnes, Jr.
(74) *Attorney, Agent, or Firm* — Cooper Legal Group, LLC

(57) ABSTRACT

One or more computing devices, systems, and/or methods for assisting a user in performing a task are provided. For example, a request may be received from the user via a messaging interface, and the task (e.g., make a reservation) may be determined (e.g., identified) based upon the request. Questions associated with information required (e.g., name, location, dates, etc.) to perform the task may be determined and provided. Visual elements (e.g., selectable buttons) corresponding to answer choices associated with the questions may be provided. A selection of a first visual element of the visual elements may be received, and the task may be performed based upon the selection of the first visual element.

20 Claims, 11 Drawing Sheets

(56) References Cited

U.S. PATENT DOCUMENTS

| | | | | |
|---|---|---|---|---|
| 2012/0245944 A1* | 9/2012 | Gruber | ............... | G06F 17/3087 704/270.1 |
| 2012/0265528 A1* | 10/2012 | Gruber | ................... | G10L 15/18 704/235 |
| 2013/0275164 A1* | 10/2013 | Gruber | ................... | G10L 17/22 705/5 |
| 2013/0283168 A1* | 10/2013 | Brown | ................... | G06F 3/165 715/728 |
| 2014/0040748 A1* | 2/2014 | Lemay | ................... | G06F 3/167 715/728 |
| 2014/0074454 A1* | 3/2014 | Brown | ................. | G06F 19/345 704/9 |
| 2014/0122109 A1* | 5/2014 | Ghanbari | ............. | G06F 19/363 705/2 |
| 2014/0164476 A1* | 6/2014 | Thomson | ............ | G06Q 10/101 709/203 |
| 2014/0193794 A1* | 7/2014 | Olander, III | ............ | G09B 7/06 434/362 |
| 2014/0317502 A1* | 10/2014 | Brown | ................. | G06F 9/4446 715/706 |
| 2015/0350118 A1* | 12/2015 | Yang | .................... | G06F 40/274 715/752 |
| 2016/0212605 A1* | 7/2016 | Clawson | ................ | H04W 4/90 |
| 2016/0275582 A1* | 9/2016 | Zuverink | ........... | G06Q 30/0613 |

OTHER PUBLICATIONS

J. Weizenbaum; ELIZA A Computer Program for the Study of Natural Language Communication Between Man and Machine, 1966.*

Mez Mobile, Mezi—Your Travel Assistant.*

* cited by examiner

MOBILE ASSISTANT

BACKGROUND

Many services, such as websites, apps, social networks, etc., may employ various techniques to help a user to perform a task. For example, a website may display a form with various input fields that each correspond to data that may be input by the user. The user may submit the data via the form, and the website (e.g., and/or an entity with access to the website) may use the data submitted via the form to perform the task.

In an example, properly performing the task may require more than one type of information from the user. For example, to reserve a hotel room with a waterfront view, it may be necessary to first receive selection, by the user, of a hotel that has waterfront views available. The use of a single form with various input fields may thus be insufficient and/or inefficient. For example, the form may not provide the user with the option of selecting a hotel room with a waterfront view (e.g., since not all hotels offer waterfront views). Thus, the user's possibilities may be unnecessarily constrained due to the form. In an example, the form may provide the user with the option of making the impossible request for a hotel room with a waterfront view, even if the hotel is in the desert. Thus, the user may be dissatisfied upon arrival to the hotel.

SUMMARY

In accordance with the present disclosure, one or more computing devices and/or methods for assisting a user in performing a task are provided. In an example, a request may be received from a user via a messaging (e.g., chat, text messaging, etc.) interface. A task (e.g., that the user may intend to perform) (e.g., make a reservation) may be determined (e.g., identified) based upon the request. One or more questions associated with information (e.g., name, location, dates, etc.) used to perform the task may be determined. A first question of the one or more questions may be provided via the messaging interface. The first question may be associated with one or more answer choices comprising a first answer choice and a second answer choice (e.g., selected from and/or ranked highly amongst a plurality of answer choices). A first visual element (e.g., a selectable button) comprising a first abbreviation (e.g., prefix, suffix, acronym, non-character based pictorial representation, etc.) of the first answer choice and a second visual element comprising a second abbreviation of the second answer choice may be provided via the messaging interface. The first visual element may be displayed concurrently with the second visual element (e.g., within a graphical user interface, of the messaging interface, associated with predictive text). A selection of the first visual element by the user may be received via the messaging interface. The task may be performed, using the first answer choice, based upon the selection of the first visual element.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
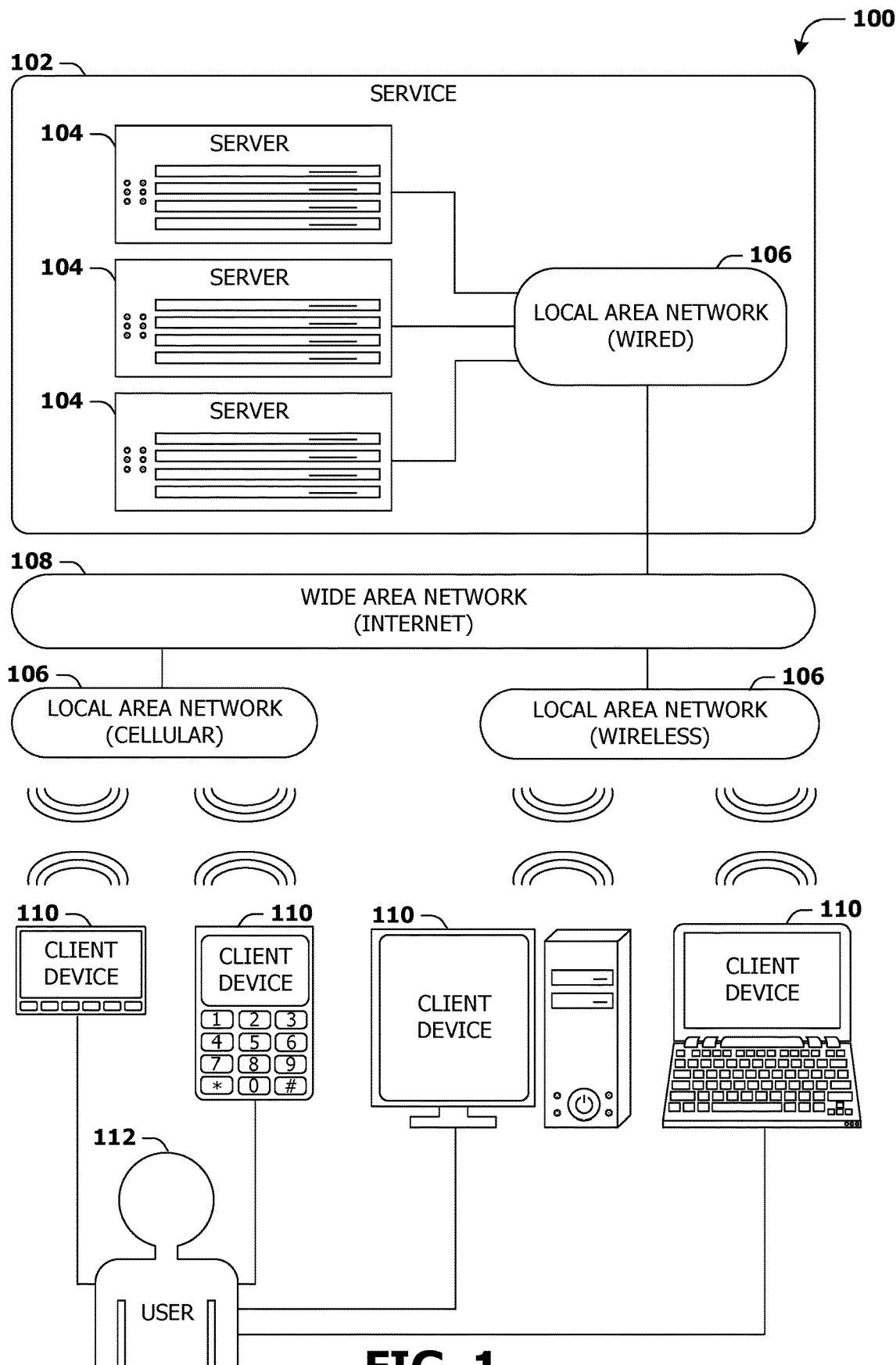
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
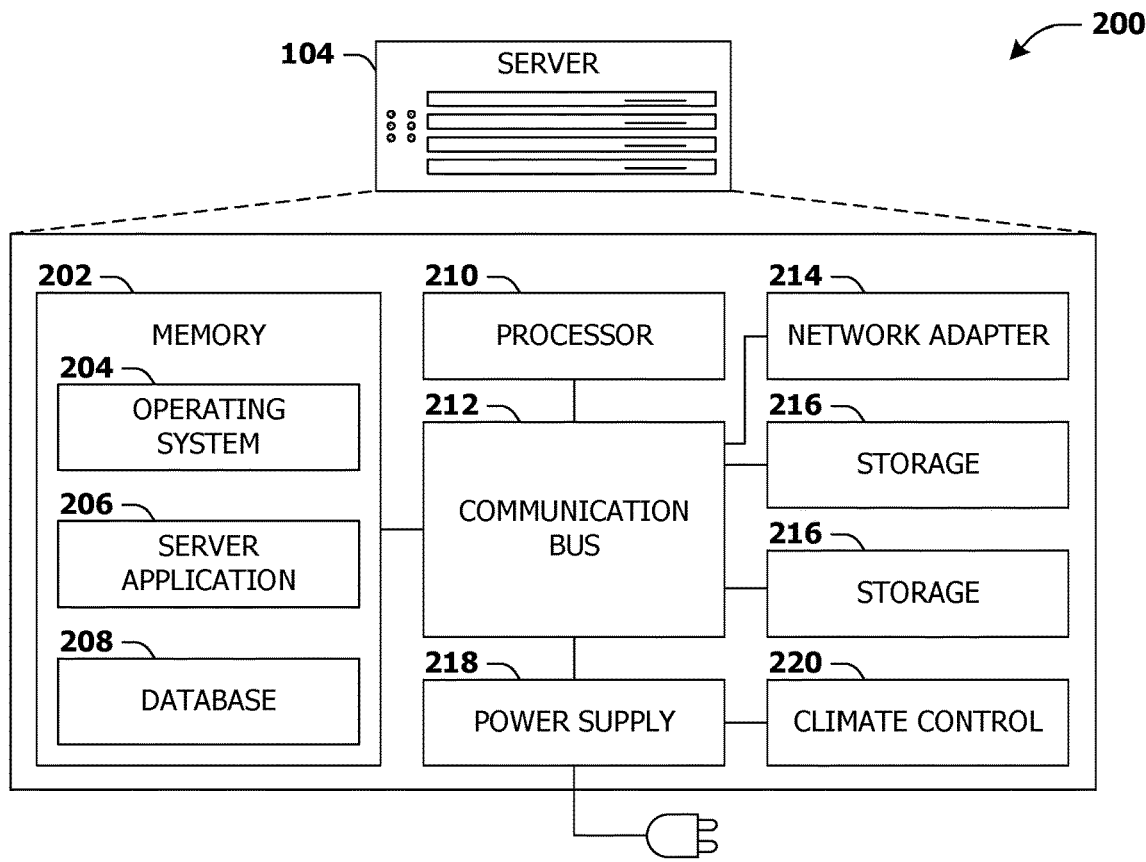
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
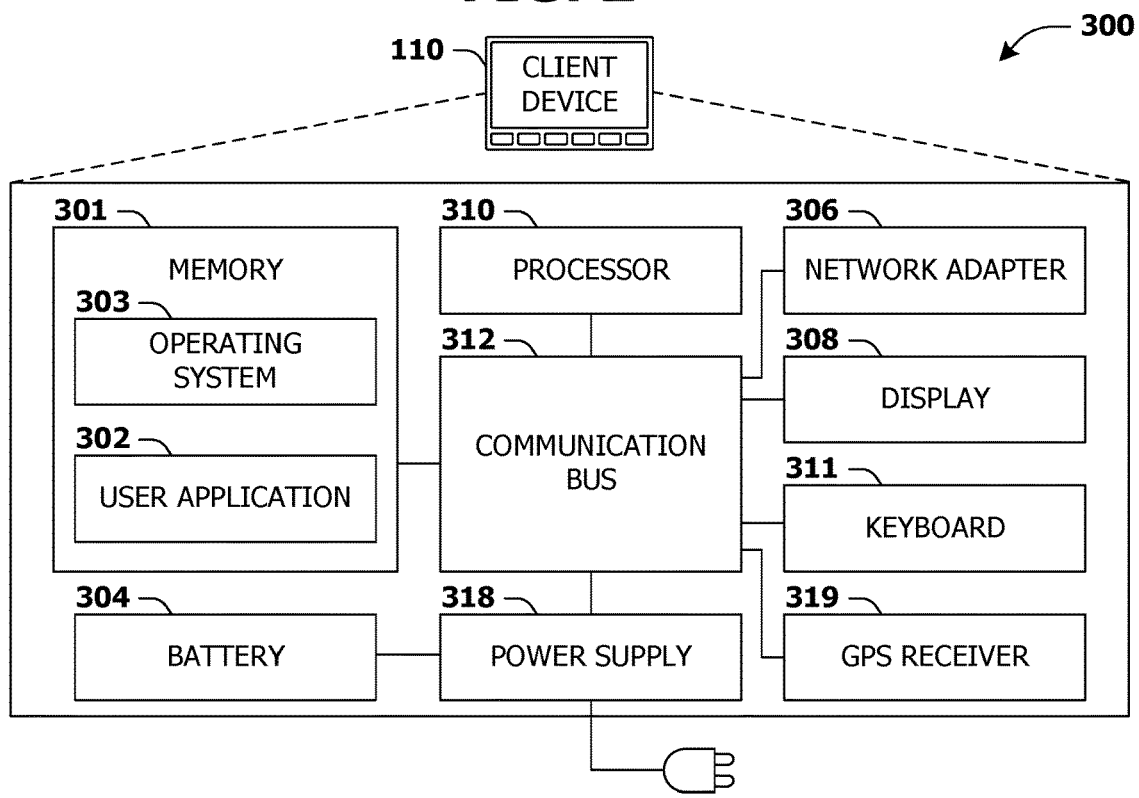
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for assisting a user in performing a task are provided. For example, the user may want to make a reservation (e.g., at a hotel, restaurant, etc.). Performance of the task may use and/or require one or more pieces of information, and thus may consume a significant amount of time and/or resources of the user (e.g., to find an appropriate entity, to contact the entity, to communicate a desire of the user to the entity, to provide information used to perform the task to the entity, etc.). Some methods, such as accessing a website and filling out a form, may be low on cost but may also provide limited assistance, and may thus be too difficult and/or time consuming to navigate. Other available methods, such as calling an agent to handle the task, may be costly and/or inconvenient. Thus, in accordance with one or more of the techniques presented herein, a task may be performed in a manner that is efficient, convenient, low cost and/or timely. Similarly, as provided herein, a service that works with a messaging interface may be used to assist the user in performing the task.

Figure 4:
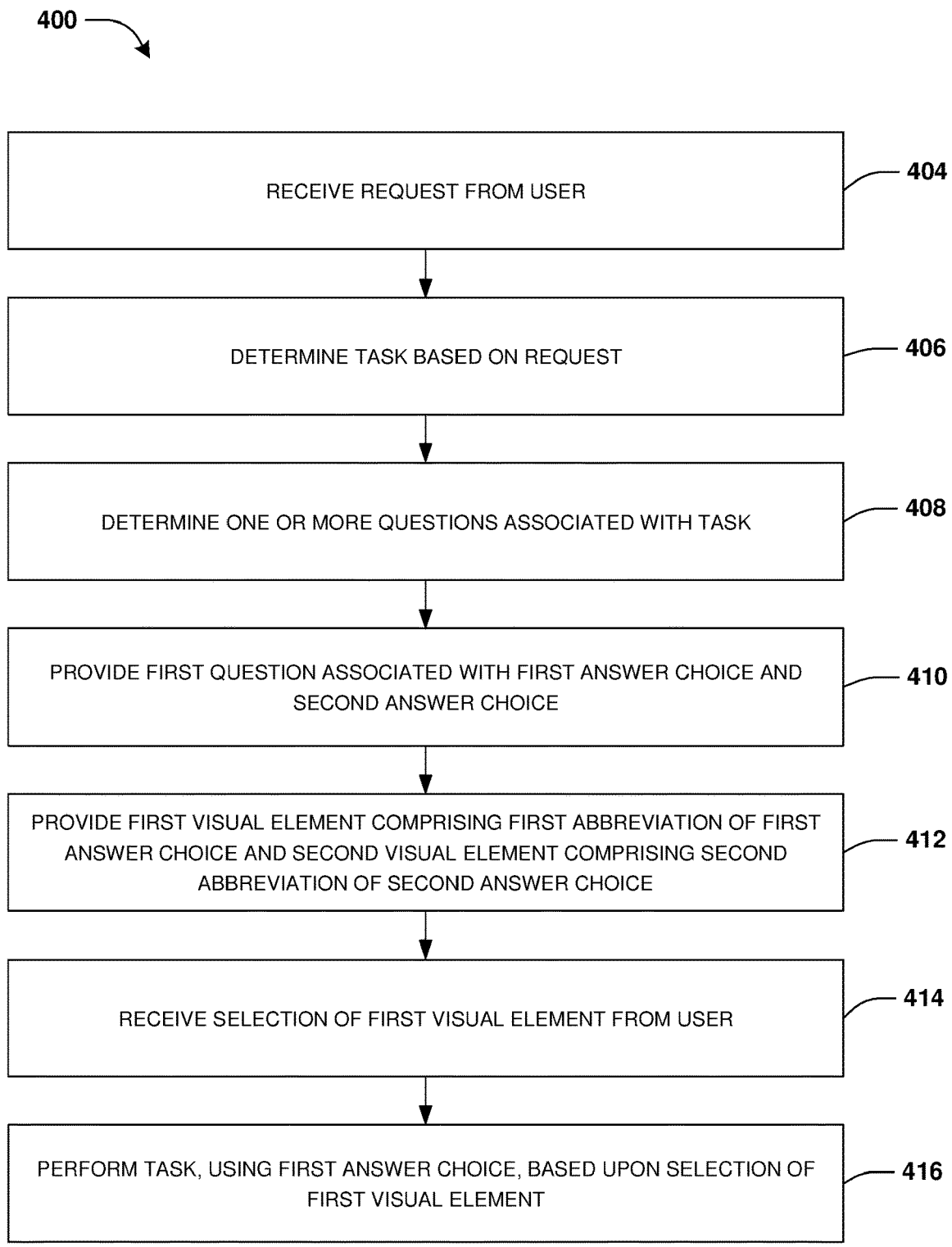
FIG. 4 is a flow chart illustrating an example method for assisting a user in performing a task.

An embodiment of assisting a user in performing a task is illustrated by an example method 400 of FIG. 4. A user, such as user Jill, may access and/or interact with a service. The service may be accessed and/or interacted with via one or more interfaces on a device of the user, such as a messaging (e.g., chat, text messaging, etc.) interface of a mobile device. The user may interact with the service by typing a message into the messaging interface. In an example, the user may interact with the service by providing one or more voice commands (e.g., via a microphone of the device). Accordingly, at 404, a request may be received (e.g., by the service) from the user (e.g., via the messaging interface; via text or audio input, such as voice, by the user; etc.). In an example, the request may comprise one or more sentences in a first language, such as English. The request may, for example, be made as a part of a chat conversation, a text messaging conversation, etc. At 406, a task (e.g., that the user may intend to perform) may be determined (e.g., identified) based upon the request. In an example, the one or more sentences may be analyzed and/or scanned for keywords to determine a likely objective of the user (e.g., using optical character recognition, word/phrase matching, etc.).

At 408, one or more questions that are associated with information associated with (e.g., required to perform) the task may be determined (e.g., using a finite-state machine (FSM) associated with the task). For example, a determination may be made that certain information is needed and/or may be useful to perform the task. The one or more questions may be designed to request and/or obtain the information from the user. For example, if an exemplary task requires a name and age of the user to be properly performed, a first exemplary question inquiring about the name of the user (e.g., "What is your name?") and a second exemplary question inquiring about the age of the user (e.g., "What is your age?") may be determined.

At 410, a first question, of the one or more questions that are associated with information associated with (e.g., required to perform) the task, may be provided (e.g., via the messaging interface; via text or audio output, such as voice, by the device to the user; etc.). The first question may, for example, be provided as a part of a chat conversation, a text messaging conversation, etc., and/or may be provided as a response to the request within a conversation. The first question may be associated with one or more answer choices comprising a first answer choice and a second answer choice. For example, the first answer choice may be one possible answer to the first question, and the second answer choice may be another possible answer to the first question. It may be appreciated that the first answer choice and/or the second answer choice may be determined based upon past answers and/or other information associated with (e.g., received from) the user, past answers and/or other information associated with (e.g., received from) users other than the user, and/or based upon other information, predictions, etc. (e.g., obtained from a database, server, etc.).

In one example of providing the first question associated with the one or more answer choices comprising the first answer choice and the second answer choice, the one or more answer choices may be ranked. It may be appreciated that the one or more answer choices may be ranked based upon past selections by the user and/or other information associated with (e.g., received from) the user, past selections by users other than the user and/or other information associated with (e.g., received from) users other than the user, and/or based upon other information, such as default settings, local, regional and/or global settings, etc. A determination may be made that the first answer choice and the second answer choice are ranked above a threshold (e.g., but that one or more other answer choices are not ranked above the threshold). The first answer choice and the second answer choice may thus be selected for presentation based upon the determination that the first answer choice and the second answer choice are ranked above the threshold (e.g., but the one or more other answer choices may not be selected for presentation based upon the determination that they are not ranked above the threshold). For example, the top X (e.g., 1, 2, 3, 4 . . . ) ranked answer choices may be selected for presentation. It may be appreciated that the selection of the first answer choice and the second answer choice may be reflective of a determination that the user is likely to respond to the first question with the first answer choice and/or the second answer choice.

In an example of providing the first question associated with the one or more answer choices comprising the first answer choice and the second answer choice, the first answer choice may comprise a first combination of a third answer choice and a fourth answer choice. For example, the third answer choice may be one possible answer to the first question, and the fourth answer choice may be another possible answer to the first question. In the example, the first answer choice may be selected to concurrently select the third answer choice and the fourth answer choice as answers to the first question.

In an example of providing the first question associated with the one or more answer choices comprising the first answer choice and the second answer choice, one or more combinations of two or more answer choices associated with the first question may be ranked. It may be appreciated that the one or more combinations and/or the two or more answer choices may be ranked based upon past selections by the user and/or other information associated with (e.g., received from) the user, past selections by users other than the user and/or other information associated with (e.g., received from) users other than the user, and/or based upon other information, such as default settings, local, regional and/or global settings, etc. A determination may be made that the first combination of the third answer choice and the fourth answer choice are ranked above a threshold (e.g., but that one or more other combinations of answer choices are not ranked above the threshold). The first combination may thus be selected for presentation via the first answer choice based upon the determination that the first combination is ranked above the threshold (e.g., but the one or more other combinations of answer choices may not be selected for presentation based upon the determination that they are not ranked above the threshold). For example, the top X (e.g., 1, 2, 3, 4 . . . ) ranked combinations of answer choices may be selected for presentation. It may be appreciated that the selection of the first combination may be reflective of a determination that the user is likely to respond to the first question with both the third answer choice and the fourth answer choice.

In some examples, the first combination may comprise a combination of a third abbreviation and/or representation of the third answer choice and a fourth abbreviation and/or representation of the fourth answer choice. For example, if the third answer choice comprises "1-apple" and the fourth answer choice comprises "2-orange," the first combination may be "apple and orange" or "1 and 2."

At 412, a first visual element, which may comprise a first abbreviation and/or other representation of the first answer choice, and a second visual element, which may comprise a second abbreviation and/or other representation of the second answer choice, may be provided (e.g., via the messaging interface). The first visual element may be displayed concurrently with the second visual element. For example, the first visual element may be adjacent to the second visual element.

In one example of providing the first visual element and the second visual element, the first visual element and/or the second visual element (e.g., and one or more other visual elements) may be provided within a graphical user interface, of the messaging interface, associated with predictive text. For example, the graphical user interface associated with predictive text may be a portion of the messaging interface used to display words, phrases, etc. predicted to be useful and/or desired in an exemplary conversation of a user. The graphical user interface associated with predictive text may change the displayed words, phrases, etc. based upon changes and/or updates to the exemplary conversation. For example, at a start of the exemplary conversation, the graphical user interface associated with predictive text may provide general words such as "I," "The," "I'm," etc. As the exemplary conversation progresses, the graphical user interface associated with predictive text may be modified to provide more specific words such as "OK," "No," "Maybe,"

etc. The user may select one or more words from the graphical user interface associated with predictive text to more easily enter the words into the conversation (e.g., the user may select the word "Maybe" with a single selection, such as a click, rather than manually typing out the word "Maybe" with five selections).

In an example of providing the first visual element and the second visual element, the first abbreviation and/or other representation of the first answer choice may be determined for the first answer choice. The determining the first abbreviation and/or other representation may comprise determining a prefix, a suffix, an acronym, an icon, a logo and/or a non-character based pictorial representation (e.g., an image, a video, etc.) for the first answer choice. For example, for the exemplary answer choice "ultraviolet," the prefix "ultra," the suffix "violet," the acronym "UV" and/or a pictorial representation of ultraviolet (e.g., on a spectrum) may be determined for the exemplary answer choice. In some examples, the exemplary answer choice may be associated with a non-character based pictorial representation (e.g., an image, a video, etc.), while the exemplary visual element may comprise a character based representation (e.g., text describing the image, the video, etc.).

In an example, the determining the first abbreviation and/or other representation may comprise determining that the first abbreviation was previously selected to be associated with the first answer choice by an entity associated with the first answer choice. For example, the entity may be a business or other organization that may specify (e.g., for a fee) that the name of the entity (e.g., "Example Corp") and/or a term (e.g., brand) associated with the entity (e.g., "Example Coffee") is abbreviated in a specific manner (e.g., "EC").

In an example, the determining the first abbreviation and/or other representation may comprise generating the first abbreviation using a first portion of the first answer choice determined to be identifiable (e.g., and not using a second portion of the first answer choice not determined to be identifiable and/or determined to not be identifiable). For example, for an exemplary answer choice "Atlantic University," an exemplary abbreviation may be generated using a first portion of the exemplary abbreviation "Atlantic" that is determined to be identifiable (e.g., and not using a second portion of the exemplary answer choice "University" that is not determined to be identifiable and/or is determined to not be identifiable). It may be appreciated that the first portion of the first answer choice may be determined to be more identifiable relative to the second portion of the first answer choice.

At 414, a selection of the first visual element may be received from the user (e.g., via the messaging interface) (e.g., the user may communicate the selection via text and/or audio (e.g., voice) input). For example, the user may click, tap, etc. on the first visual element. In an example, the selection of the first visual element may cause the first abbreviation and/or other representation to be inserted into an input text area. Selection of a submit visual element (e.g., a "Send" button) may cause content in the input text area (e.g., the first abbreviation and/or other representation) to be submitted (e.g., and subsequently received from the user). In an example, the selection of the first visual element may cause the first abbreviation and/or other representation to be (e.g., directly) submitted (e.g., to the service) (e.g., and subsequently received from the user). In an example, the first visual element and one or more other visual elements may be (e.g., concurrently) selected and/or (e.g., concurrently) received (e.g., from the user, by the service).

At 416, the task may be performed, using the first answer choice, based upon the selection of the first visual element. For example, for an exemplary task of making a reservation, where a first exemplary answer choice comprising the name John is received, the reservation may be made (e.g., by contacting the service and/or one or more other services, servers, etc.) in the name of John. It may be appreciated that confirmation and/or information associated with the performance of the task may be provided to the user.

In one example of the method 400, a second question (e.g., and a third question, a fourth question, etc., and/or as many questions as are needed to obtain a sufficient amount of information to perform the task), of the one or more questions that are associated with information associated with (e.g., required to perform) the task, may be provided (e.g., via the messaging interface). The second question may, for example, be provided as a part of the chat conversation, the text messaging conversation, etc., and/or may be provided as a response to the request within the conversation, and/or after receiving the selection of the first visual element. The second question may be associated with one or more answer choices comprising a third answer choice and a fourth answer choice. For example, the third answer choice may be one possible answer to the second question, and the fourth answer choice may be another possible answer to the second question. It may be appreciated that the third answer choice and/or the fourth answer choice may be determined based upon past answers and/or other information associated with (e.g., received from) the user, past answers and/or other information associated with (e.g., received from) users other than the user, and/or based upon other information, predictions, etc. (e.g., obtained from a database, server, etc.).

In the one example of the method 400, a third visual element, which may comprise a third abbreviation and/or other representation of the third answer choice, and a fourth visual element, which may comprise a fourth abbreviation and/or other representation of the fourth answer choice, may be provided (e.g., via the messaging interface). The third visual element may be displayed concurrently with the fourth visual element. For example, the third visual element may be adjacent to the fourth visual element.

In the one example of the method 400, a selection of the third visual element may be received from the user (e.g., via the messaging interface). For example, the user may click, tap, etc. on the displayed third visual element. In an example, the selection of the third visual element may cause the third abbreviation and/or other representation to be inserted into the input text area. Selection of the submit visual element (e.g., the "Send" button) may cause content in the input text area (e.g., the third abbreviation and/or other representation) to be submitted (e.g., and subsequently received from the user). In an example, the selection of the third visual element may cause the third abbreviation and/or other representation to be (e.g., directly) submitted (e.g., and subsequently received from the user).

In the one example of the method 400, the task may be performed, using both the first answer choice and the third answer choice, based upon the selection of the first visual element and the third visual element. For example, for the exemplary task of making the reservation, where the first exemplary answer choice comprising the name John and a third exemplary answer choice comprising the time 5 pm is received, the reservation may be made (e.g., by contacting the service and/or one or more other services, servers, etc.) in the name of John at 5 pm. It may be appreciated that confirmation and/or information associated with the performance of the task may be provided to the user.

Figure 5A:
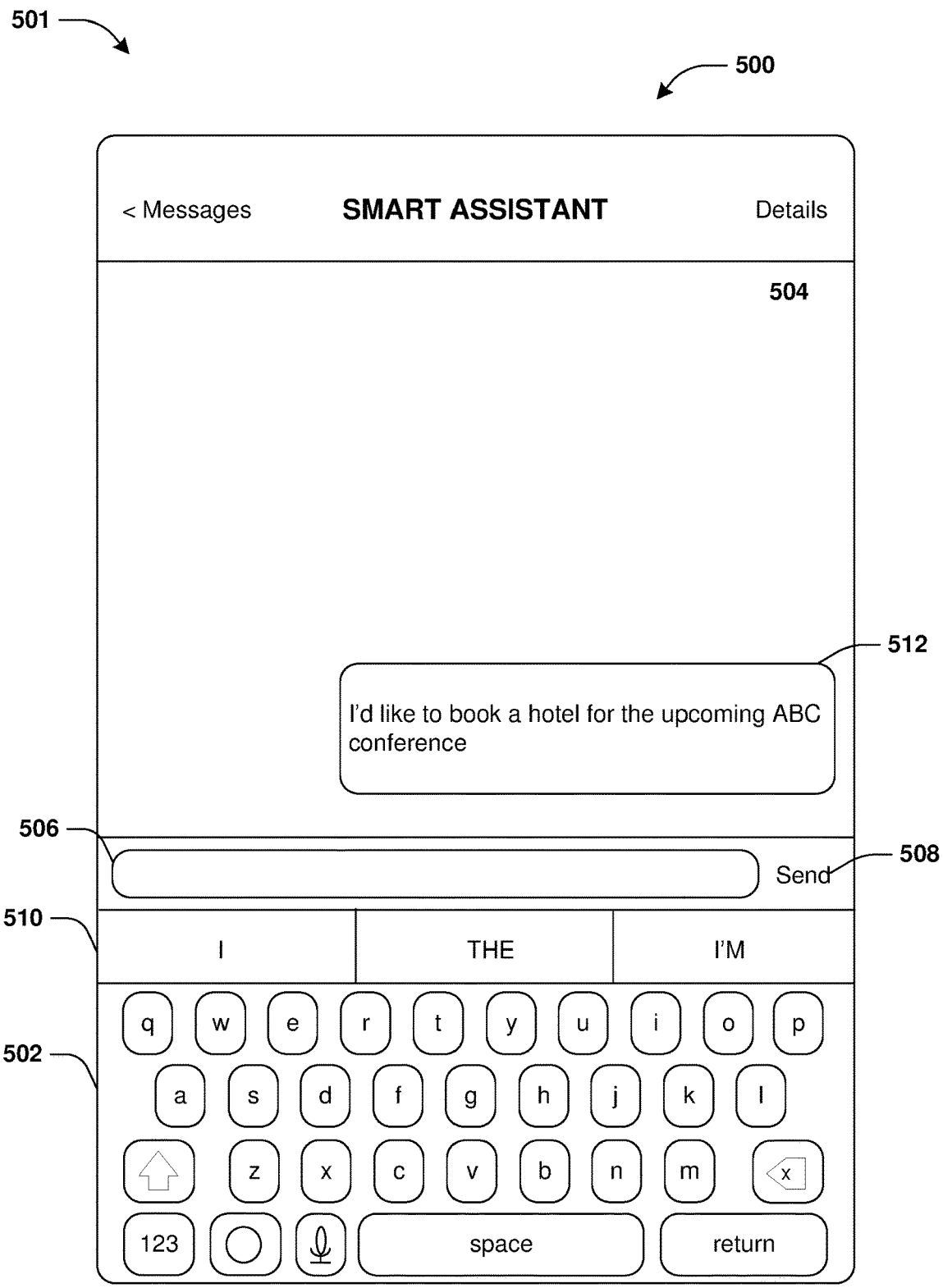
FIG. 5A is a component block diagram illustrating an example system for assisting a user in performing a task, where a user is making a request.

FIGS. 5A-5G illustrate examples of a system 501 for assisting a user in performing a task. FIG. 5A illustrates a messaging interface 500 that may be displayed on a device of the user. The messaging interface 500 may comprise a keyboard 502, an area 504 for display of a conversation between the user and a second user (e.g., a smart assistant service), an input text area 506, a submit visual element 508 and/or a graphical user interface 510 associated with predictive text. The user may submit a request 512 comprising the text "I'd like to book a hotel for the upcoming ABC conference" via the messaging interface 500.

Figure 5B:
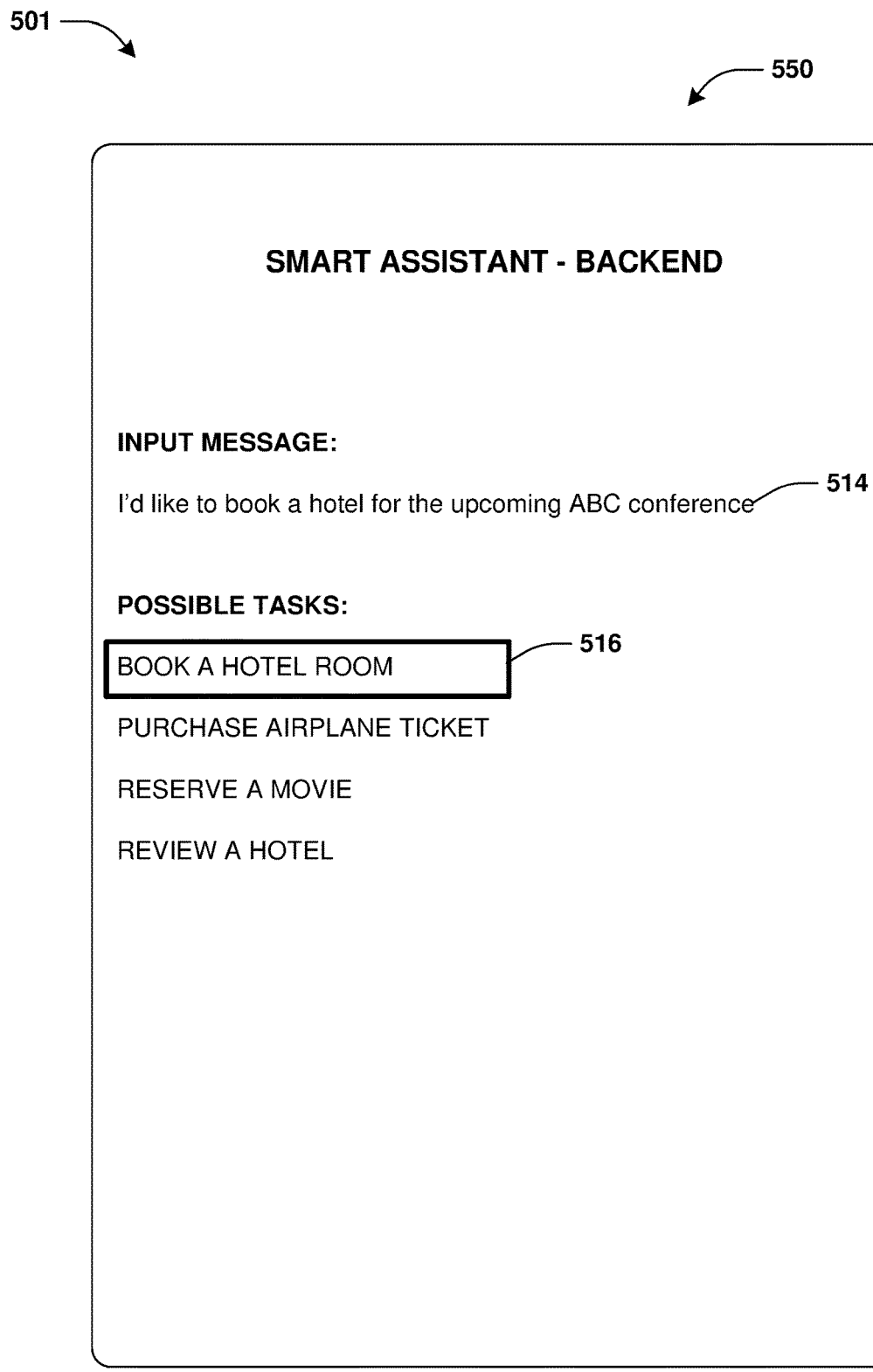
FIG. 5B is a component block diagram illustrating an example system for assisting a user in performing a task, where a task is determined.

FIG. 5B illustrates a backend system 550 (e.g., on the device of the user, on a server connected to the device via a network, etc.) that may receive and/or classify the request 512 from the user as an input message 514. A task 516 (e.g., that the user may intend to perform) may be determined (e.g., identified, predicted, selected, etc.) based upon the request 512. For example, the backend system 550 may access a database comprising a plurality of tasks (e.g., and one or more keywords, terms, types and/or formats of information, metadata, etc. associated with each task), and may select the task 516 "book a hotel room" from the plurality of tasks (e.g., upon determining that the task 516, compared to the remaining tasks of the plurality of tasks, is the most likely to be desired to be performed by the user based upon an analysis of the request 512). It may be appreciated that supplemental information associated with the task 516, such as location, date, etc., may also be determined based upon the request 512. For example, the presence of the words "book" and "hotel" in the request 512 may be used to determine that the user would like to book a hotel room, while the presence of the words "the upcoming ABC conference" may be used to determine a location (e.g., San Francisco) and date (e.g., weekend of May 15) associated with performance of the task 516.

Figure 5C:
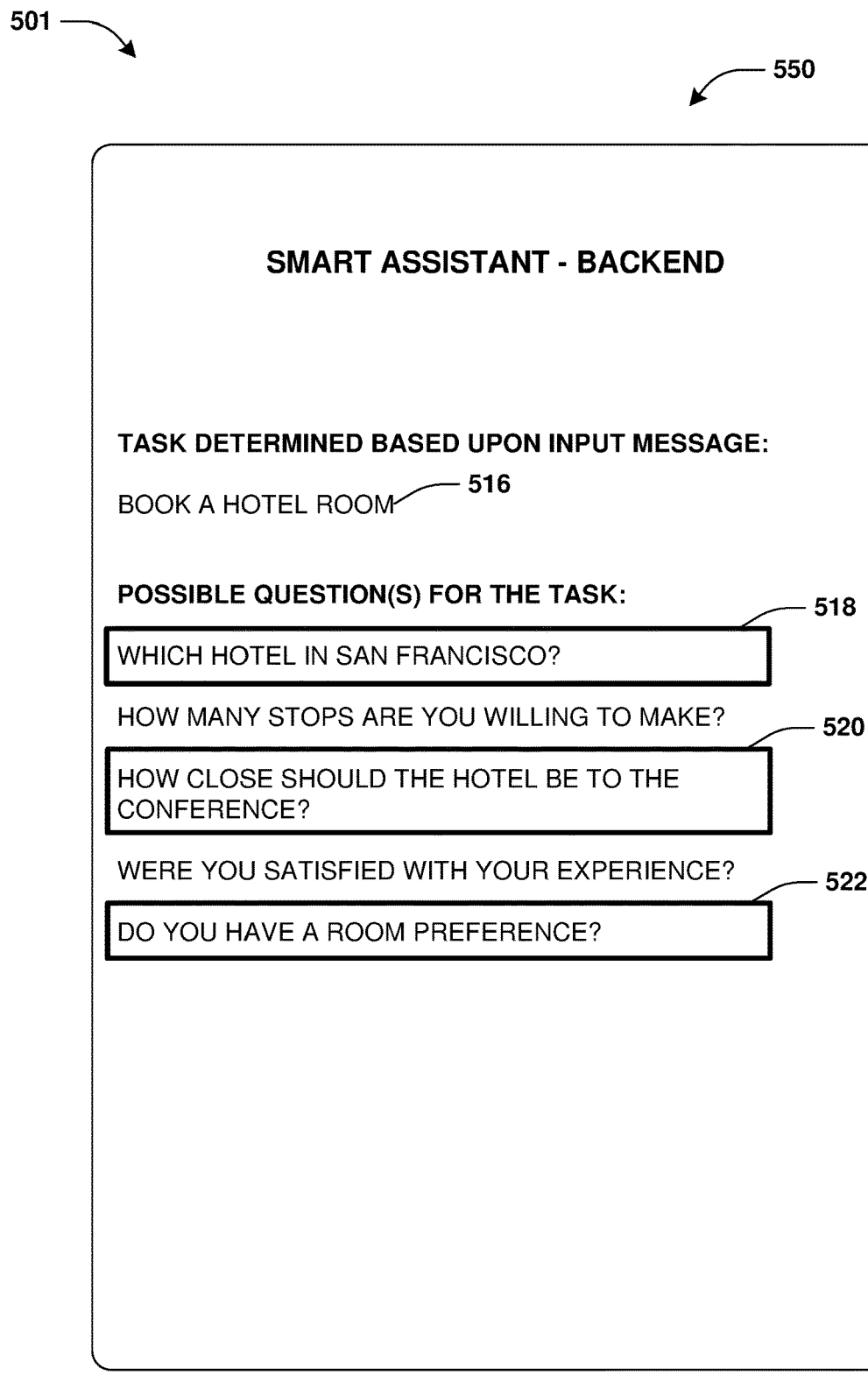
FIG. 5C is a component block diagram illustrating an example system for assisting a user in performing a task, where one or more questions associated with information required to perform the task are determined.

FIG. 5C illustrates the backend system 550 using the task 516 determined based upon the request 512 to determine one or more questions associated with (e.g., information required to perform) the task 516. For example, the backend system 550 may access a database comprising a plurality of questions (e.g., and one or more keywords, terms, types and/or formats of information, metadata, etc. associated with each question), and may select first question 518 "Which hotel in San Francisco," second question 520 "How close should the hotel be to the conference" and/or third question 522 "Do you have a room preference" from the plurality of questions (e.g., upon determining that the first question 518, the second question 520 and/or the third question 522, compared to the remaining questions of the plurality of questions, are the most likely to be associated with information needed and/or useful in performing the task 516).

Figure 5D:
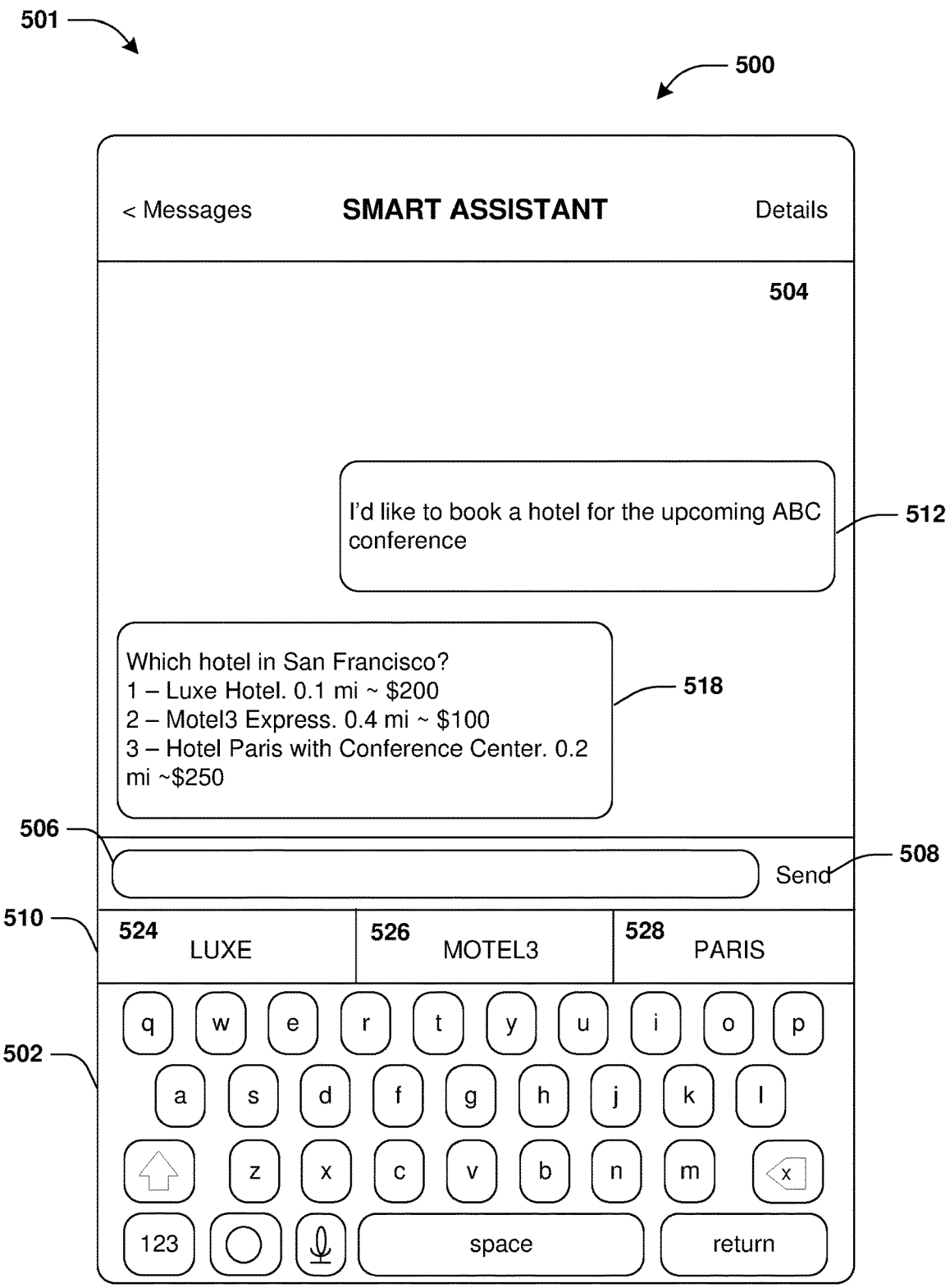
FIG. 5D is a component block diagram illustrating an example system for assisting a user in performing a task, where a first question of the one or more questions and a first visual element comprising a first abbreviation of a first answer choice is provided.

FIG. 5D illustrates the first question 518 of the one or more questions associated with the task 516 being provided (e.g., via the messaging interface 500). The first question 518 may be associated with (e.g., appended with, include, be answerable with, etc.) one or more answer choices comprising a first answer choice "Luxe Hotel," a second answer choice "Motel3 Express" and/or a third answer choice "Hotel Paris with Conference Center." It may be appreciated that the one or more answer choices may be determined based upon the request 512. For example, the presence of the words "book" and "hotel" in the request 512 may be used to determine that the user would like to book a hotel room, while the presence of the words "the upcoming ABC conference" may be used to determine a location (e.g., San Francisco) and date (e.g., weekend of May 15) during which the user would like to book the hotel, and thus the one or more answer choices may thus include hotels in San Francisco that may be available on the weekend of May 15.

FIG. 5D also illustrates a first visual element 524 (e.g., comprising a first abbreviation "Luxe" of the first answer choice), a second visual element 526 (e.g., comprising a second abbreviation "Motel3" of the second answer choice) and/or a third visual element 528 (e.g., comprising a third abbreviation "Paris" of the third answer choice) being provided (e.g., via the messaging interface 500). The first visual element 524, the second visual element 526 and/or the third visual element 528 may be provided within the graphical user interface 510 associated with predictive text. The user may select one (e.g., or more) of the illustrated visual elements and/or may type a response to the first question 518 (e.g., using the keyboard 502) into the input text area 506. It will be appreciated that, as with any/all other specific numbers provided herein, any number of visual elements are contemplated and that three visual elements are merely illustrated for demonstrative purposes.

Figure 5E:
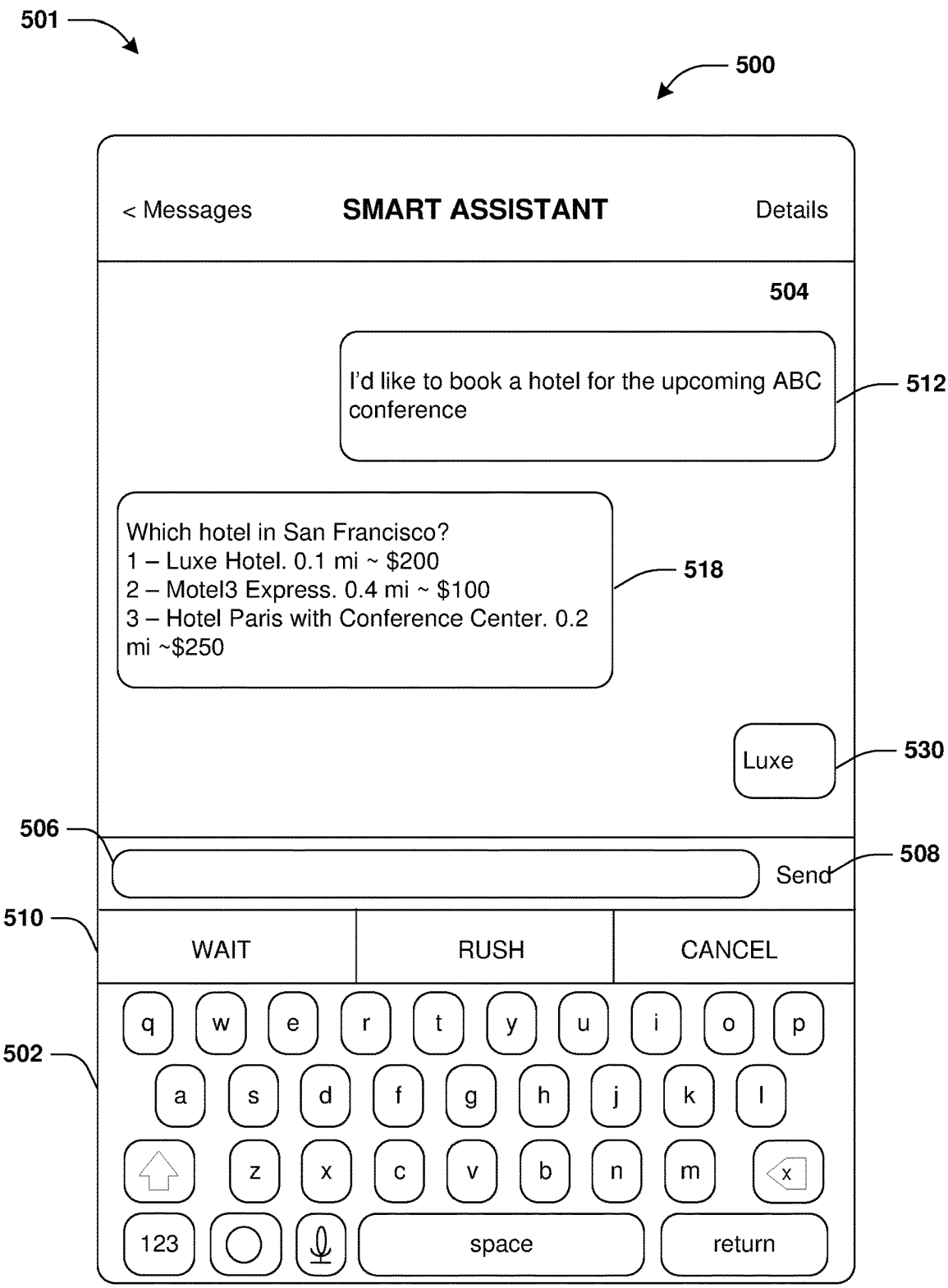
FIG. 5E is a component block diagram illustrating an example system for assisting a user in performing a task, where the user selects the first visual element.

FIG. 5E illustrates the receipt 530 of a selection of the first visual element 524 (e.g., comprising the first abbreviation "Luxe" of the first answer choice) from the user (e.g., via the messaging interface 500). In an example, the selection may be received 530 when the user clicks on the first visual element 524. In an example, the selection may be received 530 when the user clicks on the first visual element 524 and then clicks on the submit visual element 508.

Figure 5F:
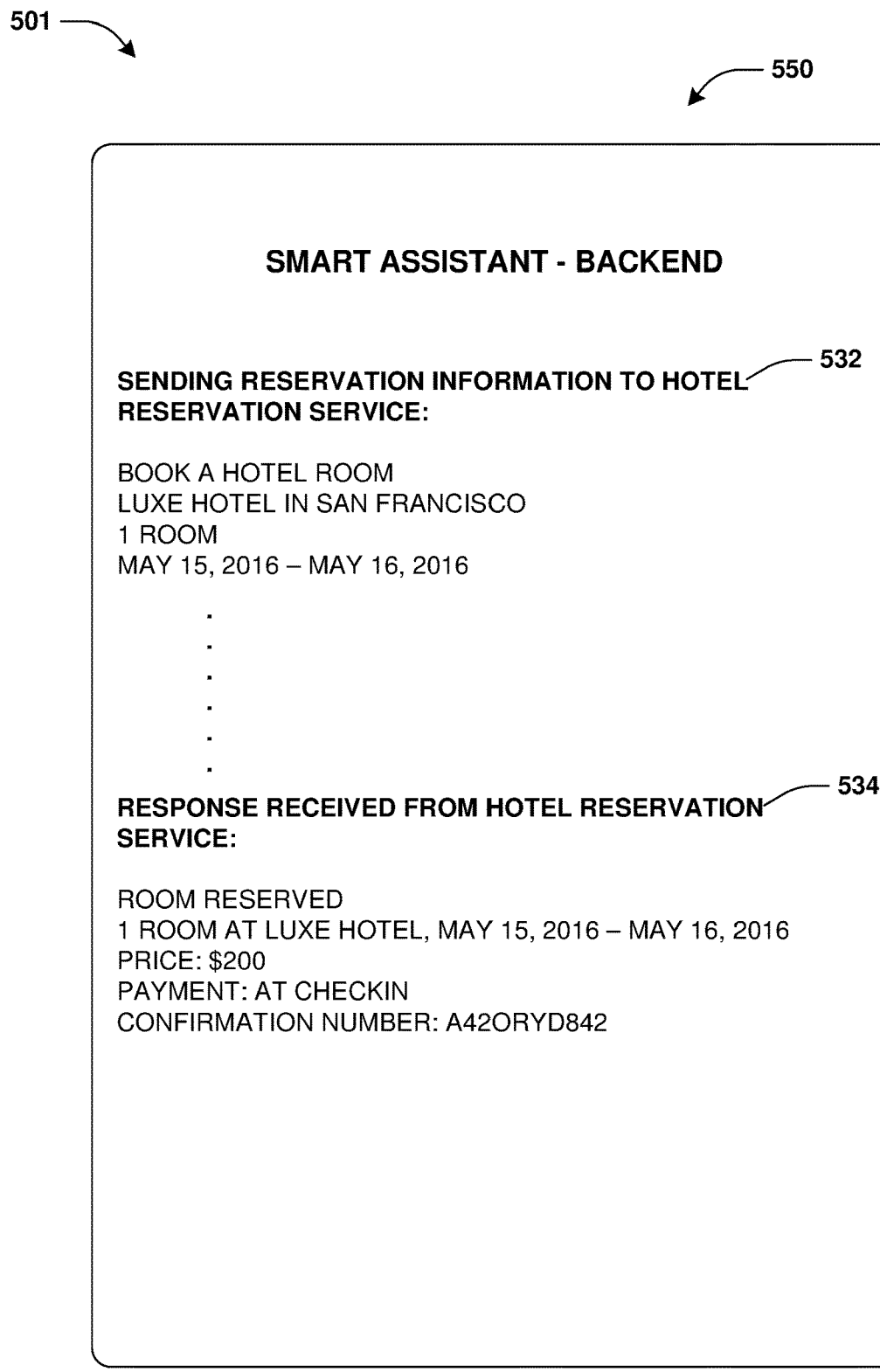
FIG. 5F is a component block diagram illustrating an example system for assisting a user in performing a task, where the task is performed.

FIG. 5F illustrates the backend system 550 using the first answer choice "Luxe Hotel" (e.g., and one or more other answer choices associated with one or more other questions) to perform the task 516. For example, the backend system 550 may submit 532 information determined based upon the request 512 from the user, such as an indication of the desire to book a hotel in San Francisco on the weekend of May 15, and information determined based upon the selection of the first visual element 524 by the user, such as an indication of the desire for the hotel to be the Luxe Hotel, to one or more services (e.g., a hotel reservation service). It may be appreciated that the submitted information may be formatted by the backend system 550 in a manner associated with the one or more services. The backend system 550 may receive a response 534 (e.g., a confirmation, error, denial, etc.) from the one or more services.

Figure 5G:
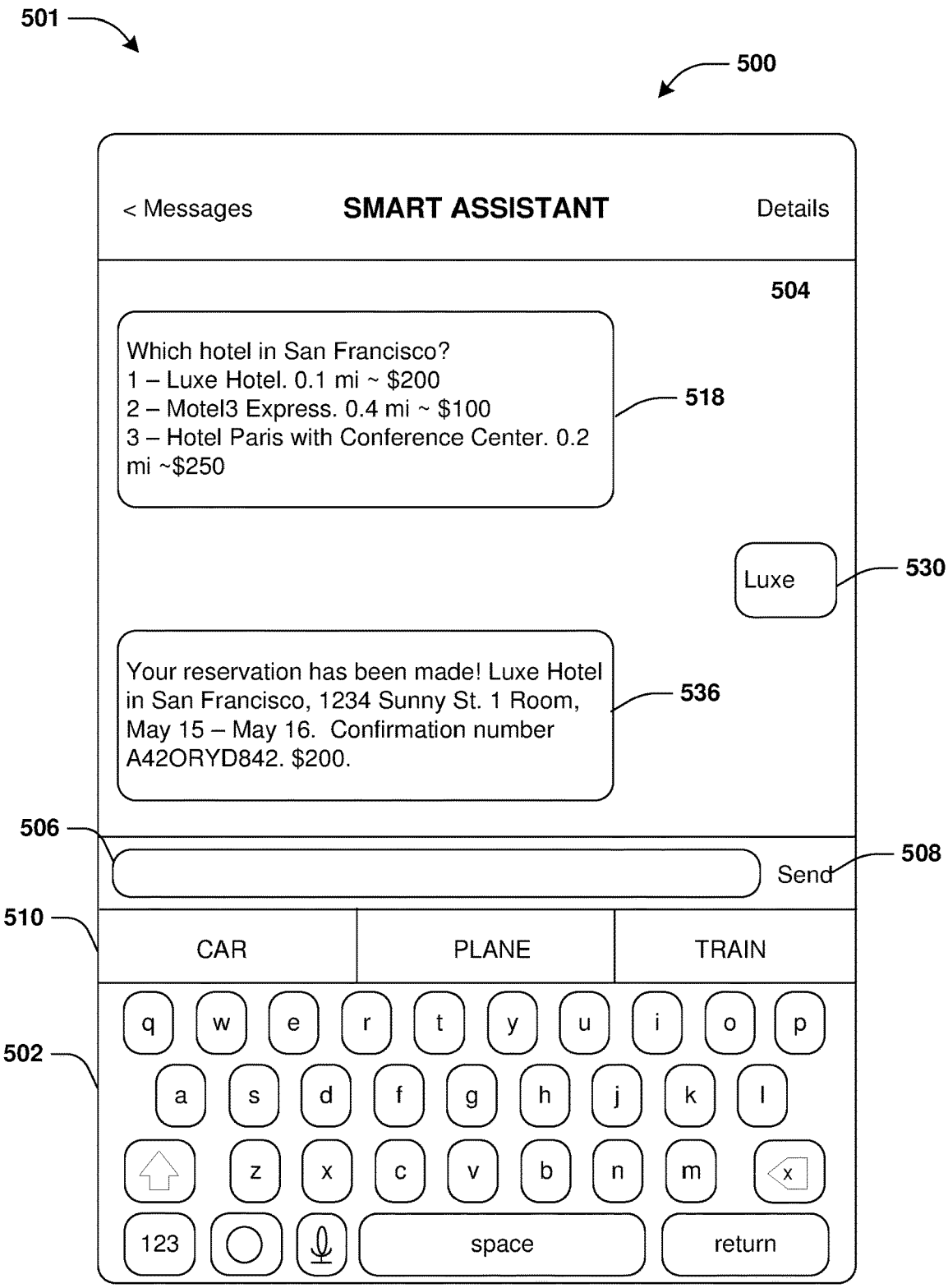
FIG. 5G is a component block diagram illustrating an example system for assisting a user in performing a task, where the user is notified of the performance of the task.

FIG. 5G illustrates the receipt, by the user, of a confirmation 536 of performance of the task 516. For example, the confirmation 536 may include details about the task 516, such as location, time, cost and/or a confirmation code.

It may be appreciated that the disclosed subject matter may assist a user in performing various tasks including but not limited to the reservation of a hotel, the reservation of a flight, the reservation of a rental car, the reservation of a restaurant, various travel arrangements, the selection of a gift (e.g., for a relative, significant other, etc.), the ordering of one or more subcomponents (e.g., groceries) needed to make a component (e.g., a meal) and/or investing (e.g., in a market). It may be appreciated that each contemplated task could be associated with one or more different and/or same questions. For example, while reservation of a hotel may be associated with questions inquiring about a time, location, room preferences and/or number of occupants, investing may be associated with questions inquiring about a level of acceptable risk, a market preference, etc. Embodiments are also contemplated where at least some of the disclosed subject matter may be used to assist the user in various educational and/or instructional applications, such as learning to cook, learning a language (e.g., German, C++, etc.) and/or learning a subject (e.g., electromagnetics).

In some examples, at least some of the disclosed subject matter may be implemented on a client (e.g., a device of a user), and in some examples, at least some of the disclosed subject matter may be implemented on a server (e.g., hosting a service accessible via a network, such as the Internet).

Figure 6:
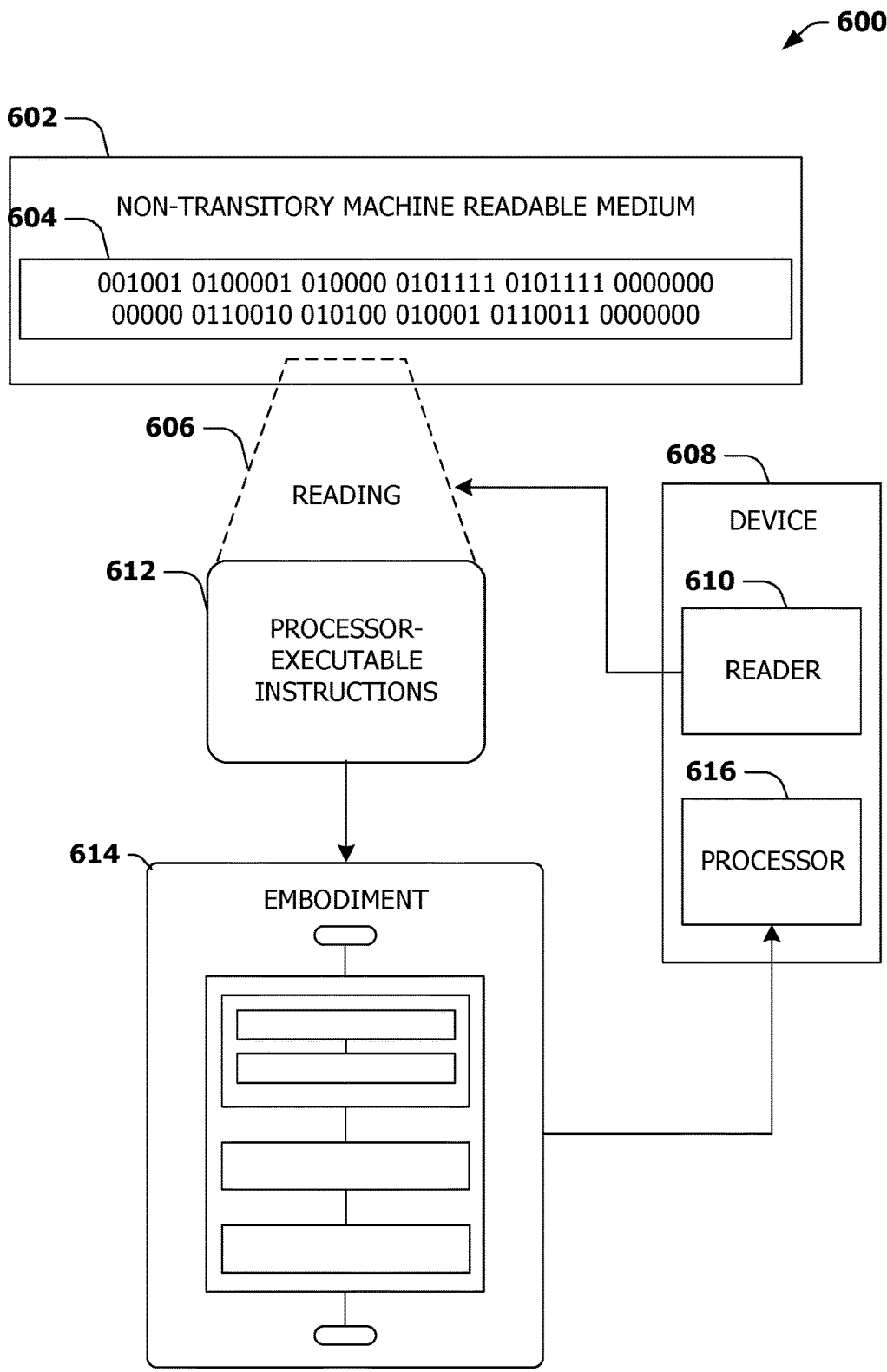
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

displaying a messaging interface comprising a conversation display area, an input text area, a predictive text interface and a keyboard;

receiving a request from a user via the input text area of the messaging interface;

determining a task based upon the request;

determining one or more questions associated with information required to perform the task;

providing a first question of the one or more questions via the conversation display area of the messaging interface, the first question associated with one or more answer choices comprising a first answer choice and a second answer choice;

concurrently providing via the messaging interface:

a first visual element, in the predictive text interface, comprising a first abbreviation of the first answer choice, wherein the first abbreviation of the first answer choice is different than the first answer choice and a portion of the first abbreviation is the same as a portion of the first answer choice, a second visual element, in the predictive text interface, comprising a second abbreviation of the second answer choice, wherein the second abbreviation of the second answer choice is different than the second answer choice and a portion of the second abbreviation is the same as a portion of the second answer choice, wherein the first abbreviation is different than the second abbreviation, and a third visual element, in the conversation display area and different than the first visual element and the second visual element, comprising a list of answer choices comprising the first answer choice and the second answer choice, the first visual element displayed concurrently with the second visual element and the third visual element, the third visual element displayed as at least part of a message transmitted via the messaging interface;

receiving a selection of the first visual element from the user via the predictive text interface of the messaging interface; and performing the task, using the first answer choice, based upon the selection of the first visual element.

2. The method of claim 1, comprising:
ranking the one or more answer choices;
determining that the first answer choice and the second answer choice are ranked above a threshold; and
selecting the first answer choice and the second answer choice for presentation based upon the determination that the first answer choice and the second answer choice are ranked above the threshold.

3. The method of claim 2, the ranking comprising:
ranking the one or more answer choices based upon information associated with the user.

4. The method of claim 2, the ranking comprising:
ranking the one or more answer choices based upon information associated with users other than the user.

5. The method of claim 1, the first answer choice comprising a first combination of a third answer choice and a fourth answer choice.

6. The method of claim 1, comprising:
ranking one or more combinations of two or more answer choices associated with the first question;
determining that a first combination of a third answer choice and a fourth answer choice of the two or more answer choices is ranked above a threshold; and
selecting the first combination for presentation via the first answer choice based upon the determination that the first combination is ranked above the threshold.

7. The method of claim 6, the first combination comprising a combination of a third abbreviation of the third answer choice and a fourth abbreviation of the fourth answer choice.

8. The method of claim 1, comprising:
providing a second question of the one or more questions via the messaging interface, the second question associated with two or more answer choices comprising a third answer choice and a fourth answer choice;
providing a fourth visual element comprising a third abbreviation of the third answer choice and a fifth visual element comprising a fourth abbreviation of the fourth answer choice via the messaging interface, the fourth visual element displayed concurrently with the fifth visual element; and receiving a selection of the fourth visual element from the user via the messaging interface,
the task performed, using the first answer choice and the third answer choice, based upon the selection of the first visual element and the selection of the fourth visual element.

9. The method of claim 1, the first visual element and the second visual element provided within a graphical user interface, of the messaging interface, associated with predictive text.

10. The method of claim 1, comprising determining the first abbreviation for the first answer choice.

11. The method of claim 1, wherein the displaying the messaging interface comprises displaying the predictive text interface between the conversation display area and the keyboard.

12. The method of claim 1, wherein the displaying the messaging interface comprises, prior to receiving the request:
displaying, in a first portion of the predictive text interface corresponding to the first visual element, first content different than the first abbreviation of the first answer choice; and
displaying, in a second portion of the predictive text interface corresponding to the second visual element, second content different than the second abbreviation of the second answer choice,
wherein the method comprises:
updating the predictive text interface, based upon the request, to display the first visual element comprising the first abbreviation instead of the first content; and
updating the predictive text interface, based upon the request, to display the second visual element comprising the second abbreviation instead of the second content.

13. The method of claim 1, wherein the displaying the messaging interface comprises displaying the predictive text interface between the input text area and the keyboard.

14. The method of claim 1, wherein the displaying the messaging interface comprises displaying the predictive text interface above the keyboard, displaying the input text area above the predictive text interface, and displaying the conversation display area above the input text area.

15. A computing device comprising:
a processor; and
memory comprising processor-executable instructions that when executed by the processor cause performance of operations, the operations comprising:
displaying a messaging interface comprising a conversation display area, a predictive text interface and a keyboard;
receiving a request from a user via the messaging interface;
determining a task based upon the request;
determining one or more questions associated with information required to perform the task;
providing a first question of the one or more questions via the conversation display area of the messaging interface, the first question associated with one or more answer choices comprising a first answer choice and a second answer choice;
concurrently providing via the messaging interface:
a first visual element, in the predictive text interface, comprising a first representation of the first answer choice, wherein a portion of the first representation is the same as a portion of the first answer choice, a second visual element, in the predictive text interface, comprising a second representation of the second answer choice, wherein a portion of the second representation is the same as a portion of the second answer choice, and a third visual element, in the conversation display area, comprising the first answer choice and the second answer choice, wherein the first representation of the first answer choice in the first visual element is displayed in a different portion of the messaging interface than the first answer choice in the third visual element, and wherein the second representation of the second answer choice in the second visual element is displayed in a different portion of the messaging interface than the second answer choice in the third visual element, the third visual element displayed as at least part of a message transmitted via the messaging interface;

receiving a selection of the first visual element from the user via the messaging interface; and performing the task, using the first answer choice, based upon the selection of the first visual element.

16. The computing device of claim 15, the first visual element and the second visual element provided within a graphical user interface, of the messaging interface, associated with predictive text.

17. The computing device of claim 15, the operations comprising:
determining the first visual element for the first answer choice.

18. The computing device of claim 17, the determining the first visual element comprising:
determining at least one of a prefix, a suffix, an acronym or a non-character based pictorial representation for the first answer choice.

19. A non-transitory machine readable medium having stored thereon processor-executable instructions that when executed cause performance of operations, the operations comprising:

displaying a messaging interface comprising a conversation display area and a predictive text interface;
determining a task;
determining one or more questions associated with the task;
providing a first question of the one or more questions via the conversation display area, the first question associated with one or more answer choices comprising a first answer choice and a second answer choice;
concurrently providing via the messaging interface:
a first visual element, in the predictive text interface, comprising a first abbreviation of the first answer choice, wherein the first abbreviation of the first answer choice is different than the first answer choice and a portion of the first abbreviation is the same as a portion of the first answer choice,
a second visual element, in the predictive text interface, comprising a second abbreviation of the second answer choice, wherein the second abbreviation of the second answer choice is different than the second answer choice and a portion of the second abbreviation is the same as a portion of the second answer choice, wherein the first abbreviation is different than the second abbreviation, and
a third visual element, in the conversation display area and different than the first visual element and the second visual element, comprising a list of answer choices comprising the first answer choice and the second answer choice, the first visual element displayed concurrently with the second visual element and the third visual element, the third visual element displayed as at least part of a message transmitted via the messaging interface;
receiving a selection of the first visual element; and
performing the task, using the first answer choice, based upon the selection of the first visual element.

20. The non-transitory machine readable medium of claim 19, wherein the displaying the messaging interface comprises displaying the predictive text interface between the conversation display area and a keyboard.

* * * * *